United States Patent [19]
Timmons et al.

[11] Patent Number: 5,980,699
[45] Date of Patent: Nov. 9, 1999

[54] METHOD FOR PREPARING SILICON NITRIDE AND SILICON NITRIDE COMPOSITES

[75] Inventors: Scott F. Timmons; Renee C. Graef, both of San Antonio, Tex.; Stuart T. Schwab, Albuquerque, N.Mex.; Montgomery D. Grimes, North Chelmsford, Mass.

[73] Assignee: Southwest Research Institute, San Antonio, Tex.

[21] Appl. No.: 08/957,181

[22] Filed: Oct. 24, 1997

[51] Int. Cl.$^6$ .............................. C01B 53/00; C01B 25/00
[52] U.S. Cl. .................... 204/157.4; 204/154.43; 204/157.45; 528/28; 423/344
[58] Field of Search ............................ 204/157.4, 157.43, 204/157.45; 528/28; 423/344

[56] References Cited

U.S. PATENT DOCUMENTS 5,093,096  3/1992  Okamura et al. .................. 423/344
5,198,519  3/1993  Mosher et al. ....................... 528/28

OTHER PUBLICATIONS

PMSE Polymeric Materials Science and Engineering, vol. 71, Fall Meeting Washington, DC. 1994 no month available.

*Primary Examiner*—Kathryn Gorgos
*Assistant Examiner*—Edna Wong
*Attorney, Agent, or Firm*—Paula D. Morris & Associates, PC

[57] ABSTRACT

A method of producing silicon nitride ceramics and silicon nitride ceramic composites. A mixture comprising a polysilazane and an additive effective to increase coupling between the mixture and electromagnetic energy is converted to a preceramic intermediate. The preceramic intermediate is treated with electromagnetic energy and thereby converted to a silicon nitride ceramic and/or a silicon nitride ceramic composite.

22 Claims, No Drawings

METHOD FOR PREPARING SILICON NITRIDE AND SILICON NITRIDE COMPOSITES

FIELD OF THE INVENTION

The invention provides a method of making silicon nitride ceramics and silicon nitride ceramic composites. Preceramic intermediates prepared from a mixture comprising of a polysilazane and a suitable additive are subjected to treatment with electromagnetic energy which is capable of inducing fast conversion of the preceramic intermediates to silicon nitride ceramics and silicon nitride ceramic composites.

BACKGROUND OF THE INVENTION

Advanced ceramics have promise in a wide variety of high technology and high temperature applications. Due to their high cost, advanced ceramics have been used primarily in the aerospace industry and for military applications. Although substantial growth in the market for advanced ceramics and advanced ceramic composites has been predicted for some years, the expected growth has not occurred at least in part due to the high cost associated with producing and fabricating such advanced ceramics. Advanced ceramics and composites simply cannot compete with cheaper metals or polymers in many applications.

Traditional powder based methods for manufacturing advanced ceramics and ceramic composites have many inherent difficulties. One difficulty is the need to burn off organic binders and to sinter the ceramic products by heating suitable starting materials to extremely high temperatures for long periods of time. Sintering is required for most ceramics to impart the desired physical and structural properties. Covalent ceramics like silicon nitride ($Si_3N_4$), are inherently difficult to sinter due to their low self-diffusivities. Consequently, even longer periods of heating and/or higher temperatures are needed to sinter the covalent materials properly. Unfortunately, voids are created during heating and sintering and often remain in the finished ceramic products. The voids have deleterious effects on the physical and structural properties of the ceramic products. Sintering acids may be used to reduce the formation of voids. However, sintering acids have deleterious effects on the high temperature strength of the resulting ceramics. Chemical-based methods have been developed in an attempt to address and circumvent some of these difficulties.

The major objectives of chemical-based methods are to reduce voids created during burn-off of organic binders and to improve ceramic sintering results. Examples of chemical-based methods are 'sol-gel' and 'preceramic polymer' techniques, such as those described by K. J. Wynne and R. W. Rice, *Ann. Rev. Mat. Sci.*, 14, 297 (1984). The 'sol-gel' technique primarily is applied to oxide glasses and ceramics such as silica, titania, cordierite, etc. The 'preceramic polymer' technique generally is applied to non-oxide ceramic products such as silicon carbide (SiC), silicon nitride ($Si_3N_4$), boron nitride (BN), etc.

Even chemical-based methods still require the starting materials and/or the intermediates to be heated, using conventional methods, to extremely high temperatures, sometimes well over 1200° C., for long periods of time. The energy efficiency of the conventional heating methods is low and the cycle time is long. The starting materials and/or the intermediates also are exposed to constantly changing temperatures during the heat-up period until the desired temperature is reached and maintained.

In order to make advanced ceramics and ceramic composites, particularly silicon nitride based non-oxide ceramics and ceramic composites, that are more uniform in quality and more competitive in cost, a need exists to develop methods to manufacture and fabricate ceramic or ceramic composite materials at lower temperatures, in shorter periods of time, and with faster, more uniform heating techniques.

SUMMARY OF THE INVENTION

The present invention provides a method comprising subjecting a mixture comprising a polysilazane and an additive to first conditions effective to produce a preceramic intermediate; and treating the preceramic intermediate with electromagnetic energy at a sufficient power and under second conditions effective to convert said preceramic intermediate to a material comprising silicon nitride, wherein said additive is effective to induce coupling between said mixture and said electromagnetic energy.

DETAILED DESCRIPTION OF THE INVENTION

The method of the present invention is suitable for making ceramics and ceramic composites comprising silicon nitride ($Si_3N_4$), including $\alpha$-$Si_3N_4$ ceramic and $\beta$-$Si_3N_4$ ceramic, and silicon nitride composites. The method is faster than previous methods for making such ceramics and ceramic composites. Silicon nitride is considered to be a promising material for a wide variety of high temperature applications because of its superior high-temperature properties and excellent strength to weight ratio.

According to the present invention, a mixture comprising a ceramic precursor and an additive is treated under conditions effective to form a preceramic intermediate. Suitable ceramic precursors include but are not necessarily limited to polysilazanes. Suitable polysilazanes may be prepared according to the methods described in U.S. Pat. No. 5,294,425, incorporated herein by reference. The polysilazanes may contain substituents or modifiers. A preferred ceramic precursor for inclusion in the mixture is perhydropolysilazane (PHPS). PHPS is a low-viscosity thermosetting liquid, which may also be prepared according to U.S. Pat. No. 5,294,425.

Additives suitable for use in the present invention include, but are not necessarily limited to borides, carbides, silicides, nitrides, phosphides, and arsenides of metallic and semiconducting elements, such as Si, Ga, and In. A preferred additive comprises a material selected from the group consisting of silicon carbide (SiC), silicon nitride ($Si_3N_4$), silicon boride, boron nitride, boron carbide, carbon, carbon fibers, carbon fibers with coatings, and mixtures thereof The foregoing additives can be purchased from various commercial sources. Boron nitride, boron phosphide, boron carbide, silicon nitride, indium phosphide and gallium aresenide are available from Johnson Matthey Catalog Company under the names Alfa® and AESAR®. Silicon carbide, silicon boride, and silicon nitride can be purchased from the Aldrich Chemical Company and Fluka Chemie AG. The silicon carbide used in the following examples was purchased from H. C. Starck, Newton, Mass.

Preferably, the additive is mixed with the polysilazane ceramic precursor before the polysilazane ceramic precursor is converted to a preceramic intermediate. The preceramic intermediate then is converted to a silicon nitride ceramic and/or silicon nitride composite product by being subjected to an electromagnetic energy under suitable conditions. The additive preferably enhances the efficiency of electromagnetic energy use by increasing the coupling between the electromagnetic energy and the preceramic intermediate. The additive also preferably increases the yields and/or facilitates the formation of the desired ceramics and ceramic composites.

The selection of an additive depends on many factors, including but not necessarily limited to the ceramic precursor, the desired product, the electromagnetic energy source and its power, and the reaction conditions. A primary consideration is the additive's ability to effect increased coupling between the ceramic precursor/preceramic intermediate and the electromagnetic energy.

Several factors should be considered to determine how much additive is used. The factors include, but are not necessarily limited to, the selected ceramic precursor, the desired product, the electromagnetic energy source and its power, and the processing conditions. The amount of an additive used to prepare the ceramics and ceramic composites may be in the range of from about 0.01 wt % to about 99 wt %, preferably in the range of from about 10 wt % to about 50 wt % of the final silicon nitride or silicon nitride composite product.

Without limiting the scope of the present invention, it is believed that many PBPS type ceramic precursors do not "couple" efficiently with electromagnetic energy sources having certain frequency ranges. Inefficient coupling results in inefficient energy transfer, and thus slower conversion to the product. One of the reasons to use an additive is to provide increased "coupling" between the electromagnetic energy source and the ceramic precursor and/or the preceramic intermediates. More efficient and increased "coupling" improves efficiency of energy usage and reduces heating time and heating cycles.

When a PHPS is the ceramic precursor, SiC is a preferred additive. For PHPS ceramic precursors, a preferred amount of SiC additive is in the range of from about 10 wt % to about 90 wt %, more preferably in the range of from about 20 wt % to about 70 wt % of the silicon nitride or silicon nitride composite product.

The mixture of a ceramic precursor and an additive may be prepared in a number of ways—dry mixing, soaking, blending, and incipient wetness, among others. Depending on the physical and chemical properties of the ceramic precursor and the additive, the mixing preferably is performed in an essentially oxygen and water free atmosphere. For instance, a PHPS or a PHPS containing mixture preferably is stored, handled and manipulated in an inert atmosphere to minimize exposure to oxygen and water. Gases useful for providing the inert atmosphere include, but are not necessarily limited to helium, neon, argon, krypton, nitrogen, hydrogen, and mixtures thereof The inert atmosphere may be static or flowing. In a flowing inert atmosphere, flow rates of the inert gas are in the range of from about 0.1 ft/min to about 30 ft/min, preferably in the range of from about 1 ft/min to about 10 ft/min.

In addition to using an inert atmosphere, other similar synthetic techniques for manipulating air or water sensitive materials may be used. Such techniques include using an inert atmosphere/vacuum manifold system and an inert atmosphere filled 'dry box.' The commercial models used in the following Examples were Vacuum Atmospheres HE-43-2 with HE-493 DRITRAIN® oxygen and water scrubbers. Many suitable techniques are described by D. F. Shriver and M. A. Drezdzon in *The Manipulation of Air-Sensitive Compounds* (John Wiley, New York, N.Y. 2nd ed. 1986), and by A. L. Wayda and M. Y. Darensbourg, in *Experimental Organometallic Chemistry* (American Chemical Society Symposium Series 357, American Chemical Society, Washington, D.C. 1987), both of which are incorporated herein by reference.

After the mixture comprising a ceramic precursor and an additive is prepared, the mixture is subjected to conditions effective to convert the mixture to a preceramic intermediate. The conversion conditions depend on the selected ceramic precursor and the additive. A suitable temperature for the conversion is in the range of from about 50° C. to about 500° C., preferably in the range of from about 100° C. to 300° C. A suitable time period to maintain such temperature is in the range of from about 0.1 hr to about 24 hr, preferably in the range of from 0.5 hr to 1 hr. A suitable pressure is in the range of from about 100 kPa to about 5000 kPa.

It may be advantageous and preferable to carry out the reaction of making the preceramic intermediate in an atmosphere that is essentially free of oxygen and water. One reason is that the ceramic precursor or the ceramic precursor-additive mixture may be sensitive to oxygen and/or water. Another reason is that it may be preferable to form a desired preceramic intermediate in a particular atmosphere. Gases for providing a suitable inert atmosphere include, but are not necessarily limited to nitrogen, helium, neon, argon, krypton, hydrogen, ammonia, and mixtures thereof. A suitable atmosphere may be static or flowing. A batch, semi-continuous, or continuous mode of operation may be used. Other techniques of manipulating air-sensitive compounds as disclosed herein also may be used.

The preceramic intermediate then is converted to a product comprising ceramics or ceramic composites by subjecting the preceramic intermediate to an electromagnetic energy source of sufficient power under conditions effective to cause the conversion.

An electromagnetic energy source is suitable for use in the invention as long as the source has a proper frequency and sufficient power to heat the preceramic intermediate to a desired temperature for a desired period of time under conditions effective to convert the preceramic intermediate to the desired ceramic or ceramic composite product in a relatively short period of time.

Preferred electromagnetic energy sources have a frequency region selected from the group consisting of a millimeter wave region and a microwave region. A millimeter wave energy source should have a frequency in the range of from about 30 GHz to about 300 GHz, more preferably in the range of from about 30 GHz to about 50 GHz. A microwave energy source should have a frequency in the range of from about 0.5 GHz to about 30 GHz, more preferably in the range of from about 1 GHz to about 27 GHz. The energy sources preferably should have a power in the range of from about 0.1 kW to about 10 kW, most preferably in the range of from about 1 kW to about 5 kW.

A preferred "converting" time period for converting the preceramic intermediate to a ceramic or ceramic composite is shorter than the time period required using conventional heating techniques. A preferred "converting" time period will depend on the ceramic precursor, the type and amount of the additive, the composition of the preceramic intermediate, the electromagnetic energy source and its power, and other reaction conditions. Suitable "converting" time periods are in the range of from about 10 seconds to about 1000 seconds, preferably in the range of from about 30 seconds to about 120 seconds, and most preferably in the range of from about 60 seconds to about 90 seconds.

A suitable "converting" pressure for converting a preceramic intermediate to a ceramic or ceramic composite product is in the range of from about 10 kPa to about 5000 kPa, preferably in the range of from about 100 kPa to about 3000 kPa.

The preceramic intermediates preferably should be treated with electromagnetic energy in an atmosphere that is essentially free of oxygen and water, as previously described. Gases for providing a suitable inert atmosphere include, but are not necessarily limited to nitrogen, helium, neon, argon, krypton, hydrogen, ammonia, and mixtures thereof Other techniques for manipulating air-sensitive compounds as disclosed herein also may be used. A batch, semi-continuous, or continuous mode of operation may be suitable for the conversion.

All ceramic and ceramic composite products produced in the present invention were characterized in the following examples using the X-ray Diffraction (XRD) method described by C. R. Blanchard and S. T. Schwab, in *Journal of American Ceramic Society*, 77, p. 1729 (1994), incorporated herein by reference.

This invention will be better understood with reference to the following examples, which illustrate, but do not limit the invention, which is solely defined by the claims.

EXAMPLE I

PHPS ceramic composites were prepared according to the method of the present invention as follows.

A PHPS ceramic precursor was mixed with different amounts of the additive SiC to form several mixtures. The amount of SiC used was varied from 2.5 wt % to 50 wt % as tabulated below in Table 1. The mixtures were placed in quartz crucibles, heated to and then maintained at 180° C. in a quartz tube furnace for three hours under flowing nitrogen. After heating, the PHPS preceramic intermediates were subjected to energy with a millimeter wave source. A quasi-optical gyrotron at Los Alamos National Laboratory in New Mexico was used to generate a 37 GHz millimeter wave. Peak power was maintained near 4.0 kW. Table 1 shows both the target beam time, 20 seconds, and the actual beam time, 19 seconds.

TABLE 1

| Sample ID | SiC Powder (wt %) | Target Beam Time(s) | Actual Beam Time(s) |
|---|---|---|---|
| A | 2.5 | 20 | 19 |
| C | 10 | 20 | 19 |
| E | 30 | 20 | 19 |
| H | 50 | 20 | 19 |

The results showed that when the SiC additive concentration was higher than about 10 wt %, silicon nitride ceramic composites, as described by C. R. Blanchard and S. T. Schwab in *Journal of American Ceramic Society*, 77, p 1729 (1994), were obtained in only about 19 seconds using the method of the present invention. The time was much shorter than the several hours needed to form such composites using conventional heating methods. The products were crystalline and contained about 50 wt % $\alpha$-$Si_3N_4$, about 25 to about 30 wt % $\beta$-$Si_3N_4$, the balance being elemental silicon.

EXAMPLE II

Procedures similar to EXAMPLE I were repeated except that the target beam time and the actual beam time were changed to 90 seconds and 58 seconds, respectively. The reaction conditions are tabulated in Table 2.

TABLE 2

| Sample ID | SiC Powder (wt %) | Target Beam Time(s) | Actual Beam Time(s) |
|---|---|---|---|
| B | 2.5 | 90 | 58 |
| D | 10 | 90 | 58 |
| F | 30 | 90 | 58 |
| J | 50 | 90 | 58 |

The results showed that when the SiC additive concentration was higher than about 10 wt %, silicon nitride ceramic composites were obtained in only about 58 seconds using the method of the present invention. The time was much shorter than the several hours needed using conventional heating methods. The products contained about 2 to about 60 wt % $\alpha$-$Si_3N_4$, about 3 to about 30 wt % $\beta$-$Si_3N_4$, the balance being elemental silicon.

EXAMPLE III

The procedures of EXAMPLE I were repeated with 50 wt % SiC and various target and actual beam times. The reaction conditions are tabulated in Table 3.

TABLE 3

| Sample ID | SiC Powder (wt %) | Target Beam Time(s) | Actual Beam Time(s) |
|---|---|---|---|
| G | 50 | 10 | 10 |
| H | 50 | 20 | 19 |
| I | 50 | 45 | 37 |
| J | 50 | 90 | 58 |
| K | 50 | 180 | 112 |

The results showed that silicon nitride ceramic composites of different compositions were made in a time in the range of from about 10 to about 180 seconds using the method of the present invention. The time was much shorter than several hours needed using conventional heating methods. The products contain about 50 to about 60 wt % $\alpha$-$Si_3N_4$, about 15 to about 35 wt % $\beta$-$Si_3N_4$, the balance being elemental silicon.

EXAMPLE IV

Two fiber-reinforced silicon nitride composites were prepared according to the method of the invention.

A graphite-coated NICALON silicon carbide fiber reinforced silicon nitride ceramic (Ceramic Grade, 8-harness satin weave, carbon coated with poly(vinylalcohol) [PVA] sizing) was purchased from Dow Corning Company. The PVA sizing was removed by soaking the fabric in hot de-ionized water, followed by rinsing with acetone, and drying at 180° C. for 24 hours.

The graphite-coated NICALON fiber reinforced silicon nitride ceramic then was mixed with a PHPS ceramic precursor. Two samples were subjected to a 37 GHz electromagnetic energy source as described in EXAMPLE II for about 20 seconds and about 60 seconds respectively. The resulting composite products were similar to those stage 0 composites obtained after pyrolysis at 1250° C. with conventional heating for three hours, demonstrating that the present method, which has much shorter processing times, was capable of making products similar to those made using conventional methods.

EXAMPLE VI

A carbon-carbon composite was prepared as follows. A reinforced composite-3 (RCC-3) carbon—carbon composite specimen with damaged oxidation protection was obtained from NASA-Johnson Space Center in Texas. A mixture of the composite and PHPS was subjected to a 37 GHz electromagnetic energy source as described in EXAMPLE II for 100 seconds. The resultant composite product was similar to that obtained by thermal treatment at about 1250° C. for about one hour using conventional heating.

Persons of ordinary skill in the art will recognize that many modifications may be made to the present invention without departing from the spirit and scope of the invention. The embodiment described herein is meant to be illustrative only and should not be interpreted as limiting the present invention, which is defined in the following claims.

We claim:

1. A method comprising:
   subjecting a mixture comprising a perhydropolysilazane and an additive to first conditions effective to produce a preceramic intermediate; and
   treating said preceramic intermediate with electromagnetic energy at a sufficient power and under second conditions effective to convert said preceramic intermediate to a ceramic comprising silicon nitride,
   wherein said additive is present in said mixture in an amount effective to induce sufficient coupling between said mixture and said electromagnetic energy to convert said preceramic intermediate to said ceramic comprising silicon nitride.

2. The method of claim 1 wherein said additive comprises a compound selected from the group consisting of silicon carbide, silicon nitride, and carbon.

3. The method of claim 1 wherein said additive comprises silicon carbide.

4. The method of claim 1 wherein said additive comprises silicon nitride.

5. The method of claim 1 wherein said additive comprises carbon, carbon fibers, and carbon fibers with coatings.

6. The method of claim 1 wherein said electromagnetic energy comprises a millimeter wave energy source having a frequency in the range of from about 30 GHz to about 300 GHz.

7. The method of claim 1 wherein said electromagnetic energy comprises a microwave energy source having a frequency in the range of from about 0.5 GHz to about 30 GHz.

8. The method of claim 1 wherein said first conditions comprise heating said mixture to a temperature in the range of from about 50° C. to about 500° C. for a time period in the range of from about 0.1 hours to about 24 hours.

9. The method of claim 1 wherein said second conditions comprise treating said preceramic intermediate with said electromagnetic energy having a power in the range of from about 0.1 kW to about 10 kW for a time period in the range of from about 10 seconds to about 1000 seconds.

10. The method of claim 9 wherein said electromagnetic energy comprises a millimeter wave energy source having a frequency in the range of from about 30 GHz to about 300 GHz.

11. The method of claim 9 wherein said electromagnetic energy comprises a microwave energy source having a frequency in the range of from about 0.5 GHz to about 30 GHz.

12. The method of claim 1 wherein
    said electromagnetic energy has a power in the range of from about 0.1 kW to about 10 kW; and
    said second conditions comprise exposing said preceramic intermediate to said electromagnetic energy for a time period in the range of from about 10 seconds to about 1000 seconds in an atmosphere selected from the group consisting of nitrogen, hydrogen, ammonia, argon, helium, and mixtures thereof.

13. The method of claim 1 wherein said additive comprises fibers.

14. A method comprising:
    subjecting a mixture comprising a perhydropolysilazane and silicon carbide to first conditions comprising heating said mixture to a temperature in the range of from about 50° C. to about 500° C. for a time period in the range of from about 0.1 hours to about 24 hours to form a preceramic intermediate; and
    treating said preceramic intermediate with electromagnetic energy having a power in the range of from about 0.1 kW to about 10 kW for a time period in the range of from about 10 seconds to about 1000 seconds to convert said preceramic intermediate to a ceramic comprising silicon nitride.

15. The method of claim 14 wherein said electromagnetic energy comprises millimeter wave energy having a frequency in the range of from about 30 GHz to about 300 GHz.

16. The method of claim 15 wherein said method is performed in an atmosphere which is free of oxygen and water.

17. The method of claim 14 wherein said electromagnetic energy comprises microwave energy having a frequency in the range of from about 0.5 GHz to about 30 GHz.

18. The method of claim 17 wherein said method is performed in an atmosphere which is free of oxygen and water.

19. The method of claim 14 wherein said method is performed in an atmosphere which is essentially free of oxygen and water.

20. The method of claim 14 wherein said silicon carbide comprises fibers.

21. A method of making a ceramic comprising an amount of silicon nitride, said method comprising:
    forming a mixture comprising a perhydropolysilazane and an amount of silicon carbide in the range of from about 10 wt % to about 90 wt % of said mixture;
    subjecting said mixture to a temperature in the range of from about 100° C. to about 300° C. for a time period in the range of from about 30 minutes to about 10 hours to produce a preceramic intermediate; and
    treating said preceramic intermediate in an inert atmosphere comprising nitrogen with electromagnetic energy having a frequency of about 37 GHz and a power of about 4.0 kW for a time period in the range of from about 10 seconds to about 5 minutes to convert said preceramic intermediate to said ceramic comprising silicon nitride.

22. The method of claim 21 wherein said silicon carbide comprises fibers.

* * * * *